US010984744B2

(12) United States Patent
Takeuchi et al.

(10) Patent No.: US 10,984,744 B2
(45) Date of Patent: Apr. 20, 2021

(54) DISPLAY DEVICE INCLUDING A DRIVER CIRCUIT OUTPUTTING A PULSE SIGNAL TO SCANNING SIGNAL LINES AND METHOD OF DRIVING THE DISPLAY DEVICE

(71) Applicant: Sharp Kabushiki Kaisha, Sakai (JP)

(72) Inventors: Yohei Takeuchi, Sakai (JP); Takuya Watanabe, Sakai (JP); Akira Tagawa, Sakai (JP); Yasuaki Iwase, Sakai (JP); Jun Nishimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/579,895

(22) Filed: Sep. 24, 2019

(65) Prior Publication Data

US 2020/0105215 A1 Apr. 2, 2020

Related U.S. Application Data

(60) Provisional application No. 62/738,107, filed on Sep. 28, 2018.

(51) Int. Cl.

*G06F 3/038* (2013.01)
*G09G 5/00* (2006.01)
*G09G 3/36* (2006.01)

(52) U.S. Cl.

CPC ......... *G09G 3/3648* (2013.01); *G09G 3/3674* (2013.01); *G09G 2310/08* (2013.01)

(58) Field of Classification Search

CPC ............................................. G09G 2310/0286
See application file for complete search history.

(56) References Cited

U.S. PATENT DOCUMENTS

2010/0245312 A1* 9/2010 Yamazaki ............ G09G 3/3677 345/208
2015/0268777 A1* 9/2015 Okamura ............ G06F 3/04166 345/205
2016/0034097 A1* 2/2016 Chae ..................... G06F 3/0443 345/173
2016/0307526 A1 10/2016 Shibata et al.
2017/0178559 A1* 6/2017 Kim ....................... G11C 19/28
2018/0012533 A1* 1/2018 Lee ....................... G09G 3/2092
2018/0240529 A1* 8/2018 Wang ................... G11C 19/184
2018/0329547 A1* 11/2018 Wu ........................ G11C 19/28
2019/0287475 A1* 9/2019 Lee ...................... G09G 3/3266

FOREIGN PATENT DOCUMENTS

JP 2016-206302 A 12/2016

* cited by examiner

*Primary Examiner* — Kirk W Hermann

(57) ABSTRACT

To prevent a decrease in display quality caused when a display apparatus performs pause driving. One end of the n-th scanning signal line (GLn) is connected to the n-th stage circuit (UCn) of a driver circuit. The other end of the n-th scanning signal line is connected to a waveform adjusting circuit (HKn) which adjusts the waveform of the pulse signal of the n-th scanning signal line (GLn) by using a clock signal (CKA) and the pulse signal of the m-th scanning signal line (GLn−1) scanned prior to the n-th scanning signal line.

14 Claims, 6 Drawing Sheets

DISPLAY DEVICE INCLUDING A DRIVER CIRCUIT OUTPUTTING A PULSE SIGNAL TO SCANNING SIGNAL LINES AND METHOD OF DRIVING THE DISPLAY DEVICE

TECHNICAL FIELD

The present invention relates to a display device.

BACKGROUND ART

Recently, there has been an increasing demand for narrowing the picture-frame in display apparatuses such as a liquid-crystal panel used in a notebook PC. In contrast, in a gate-driver monolithic liquid-crystal panel which includes TFTs (thin film transistors) as switching devices and in which gate signals are input to the display area from a gate driver formed in the picture-frame area, the narrowness of the left and right areas of the picture-frame is influenced, to a large extent, by the size of the gate driver. Accordingly, if a configuration of one-side drive, not two-side drive, is employed, the area of the left and right sides of the picture-frame may be reduced. The two-side drive indicates that gate drivers are disposed on both left and right sides of the picture-frame. The one-side drive indicates that a gate driver is disposed only on the left or right side of the picture-frame.

Recently, there are known display apparatuses which perform pause driving in which, during a period over which the potential of the pixels is held, the driving voltage of the display panels is switched OFF in order to achieve low power consumption of the display apparatuses. For display apparatuses used in notebook PCs, there is an increasing demand for a configuration in which a touch panel overlies a display panel. In these display apparatuses, it is necessary to interrupt and pause driving of the gate drivers, for example, due to acquisition of a time for driving the touch panels and a difference between the display frequency of the display panels and the operating frequency of the touch panels.

Display panels such as a liquid-crystal panel use the output scanning signal at a stage subsequent to the target stage. In contrast, at a pausing stage in which pause driving is performed, it is not possible to receive the output operation signal from a subsequent stage, which may cause a decrease in display quality. Accordingly, there is a known technique in which, when pause driving is performed, in order to improve display quality before and after a pause period, one frame period is divided into periods, and the voltage, the timing, the polarity of the driving signal provided to a period are changed (for example, see PTL 1).

CITATION LIST

Patent Literature

PTL 1: Japanese Unexamined Patent Application Publication No. 2016-206302

SUMMARY OF INVENTION

Technical Problem

However, as display panels are made larger and have higher resolution, the load of the display panels is made heavier. One-side drive has a problem that a gate waveform is changed between just after being output from the gate driver and after passing through the panel load. In addition, display panels, which perform pause driving, have the following problem: changing a drive signal causes not only complicated control but also failure of use of a typical display driver.

An aspect of the present invention is made to view the state described above, and an object thereof is to provide a display device which may prevent a decrease in display quality caused when the display apparatus performs pause driving.

Solution to Problem (1) According to an embodiment of the present invention, there is provided a display device in which a plurality of scanning signal lines and a driver circuit are formed on a single substrate. The driver circuit outputs a pulse signal to each of the plurality of scanning signal lines. The driver circuit includes the n-th stage circuit and a waveform adjusting circuit. The n-th stage circuit is connected to a first end of the n-th scanning signal line included in the plurality of scanning signal lines. The waveform adjusting circuit adjusts the waveform of the pulse signal of the n-th scanning signal line by using a clock signal and the pulse signal of the m-th scanning signal line scanned prior to the n-th scanning signal line. A second end of the n-th scanning signal line is connected to the waveform adjusting circuit.

(2) According to an embodiment of the present invention, there is provided a display device in which, in addition to the configuration described in (1), the n-th stage circuit and the waveform adjusting circuit are disposed with the n-th scanning signal line interposed in between. The waveform adjusting circuit steepens the trailing end of the pulse transmitted through the n-th scanning signal line.

(3) According to an embodiment of the present invention, there is provided a display device in which, in addition to the configuration described in (1), the n-th stage circuit is supplied with a clock signal having the identical phase as the clock signal.

(4) According to an embodiment of the present invention, there is provided a display device in which, in addition to the configuration described in (1), the waveform adjusting circuit includes a first transistor, a second transistor, and a node connected to a gate terminal of the first transistor. The second end of the n-th scanning signal line is connected to the signal source of the clock signal through the first transistor. The node is connected to the m-th scanning signal line through the second transistor.

(5) According to an embodiment of the present invention, there is provided a display device in which, in addition to the configuration described in (4), a first one of conductive terminals of the second transistor is connected to the node, and a second one of the conductive terminals and a gate terminal of the second transistor is connected to the m-th scanning signal line.

(6) According to an embodiment of the present invention, there is provided a display device in which, in addition to the configuration described in (1), the waveform adjusting circuit includes a first transistor, a second transistor, a third transistor, and a node connected to a gate terminal of the first transistor. The node is connected to the power supply through the third transistor.

(7) According to an embodiment of the present invention, there is provided a display device in which, in addition to the configuration described in (6), to the gate terminal of the third transistor, receives the pulse signal of a scanning signal line scanned subsequent to the n-th scanning signal line.

(8) According to an embodiment of the present invention, there is provided a display device in which, in addition to the configuration described in (1), the display device includes a semiconductor layer that includes oxide semiconductor.

(9) According to an embodiment of the present invention, there is provided a method of driving a display device according to (1) described above. In the method, one or more scan pause periods are provided in one vertical scanning period, and the clock signal is fixed in an inactive state during the scan pause periods.

Advantageous Effects of Invention

According to an aspect of the present invention, a decrease in display quality may be prevented when pause driving is performed.

DESCRIPTION OF EMBODIMENTS

First Embodiment

A first embodiment of the present invention will be described in detail below.

[The Overview of a Display Device]

Figure 1:
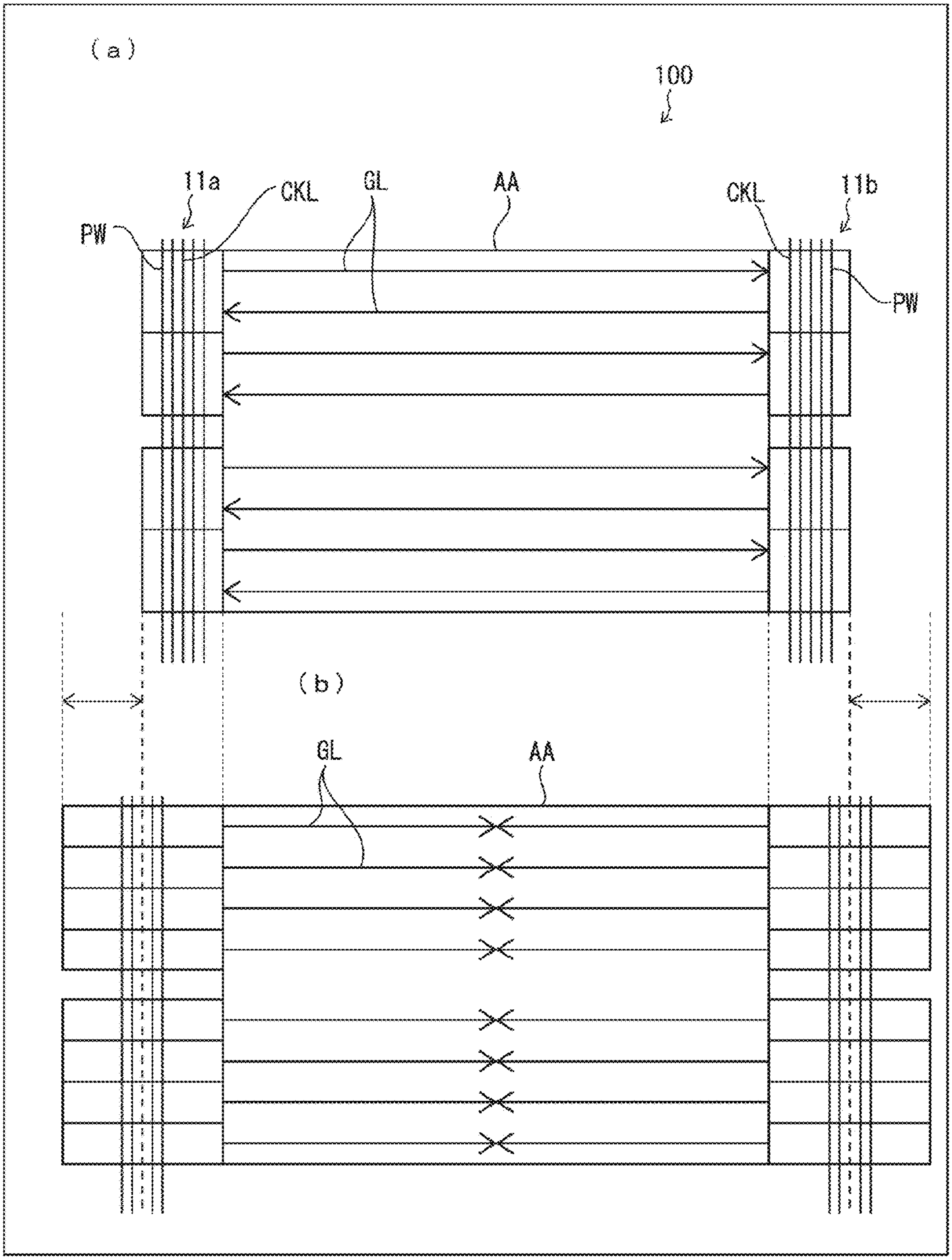
FIG. 1(*a*) is a schematic view of the configuration of a display device according to a first embodiment, and FIG. 1(*b*) is a schematic view of a comparison example of a display device.

FIG. 1(*a*) is a schematic view of the configuration of a display device 100 according to the first embodiment. The display device 100 is suitable for a liquid crystal display. However, this is not limiting. The display device 100 may be applied also to an OLED (organic light emitting diode) display or a QLED (quantum dot light-emitting diode) display.

The display device 100 includes a semiconductor layer, multiple insulating layers, and multiple metal layers which are formed on a glass substrate. A display area (active area) AA and shift registers 11*a* and 11*b*, which are disposed so as to face each other with the display area AA interposed in between, are formed on the same glass substrate. As a material of the semiconductor layer, oxide semiconductors including an oxide semiconductor (for example, indium (In), gallium (Ga), and zinc (Zn)) are suitable. However, this is not limiting. Amorphous silicon, polycrystalline silicon, CG silicon, or the like may be used.

In the display device 100, for example, odd-numbered scanning signal lines GL are connected to the shift register 11*a*, and even-numbered scanning signal lines GL are connected to the shift register 11*b*. In the display area AA, multiple sub pixels, which are disposed in a matrix, multiple scanning signal lines GL, and multiple data signal lines are disposed (not illustrated). Each of the sub pixels includes a transistor and a pixel electrode. The pixel electrode is connected to a scanning signal line GL and a data signal line through the transistor. A scanning signal line GL is supplied with a pulse signal (scanning signal) from the shift register 11*a* or the shift register 11*b*. Each of the shift registers 11*a* and 11*b* is connected to power-supply lines PW (two lines for VDD and VSS) and clock signal lines CKL (three lines for transmitting three-phase clock signals CKA, CKB, and CKC). However, this is just exemplary.

Figure 2:
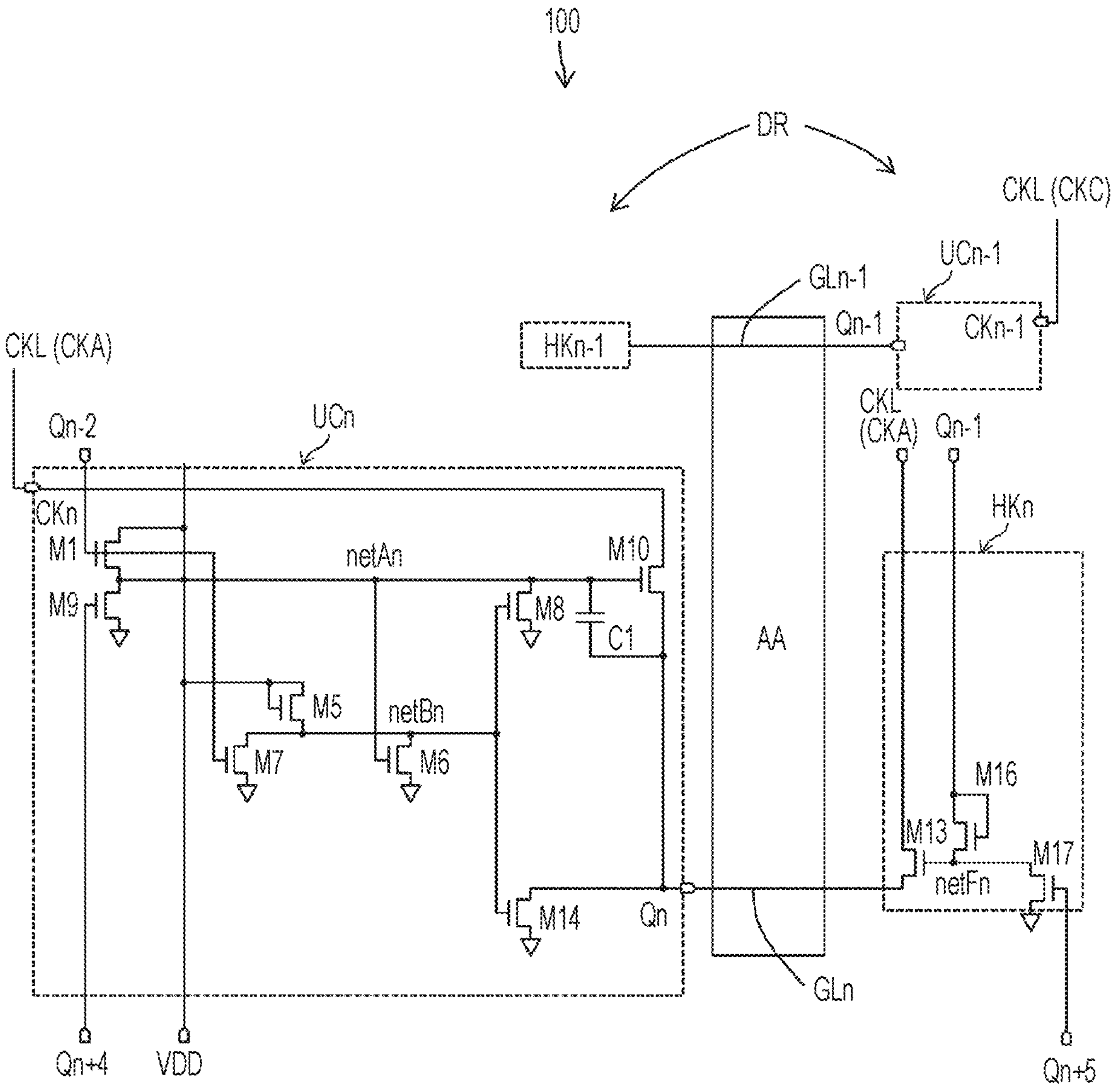
FIG. 2 is a circuit diagram illustrating the configuration of a display device according to the first embodiment.

FIG. 2 is a circuit diagram illustrating the configuration of a display device according to the first embodiment. The shift register 11*a* includes the n-th stage circuit UCn. One end of a scanning signal line GLn (the n-th scanning signal line) is connected to the n-th stage circuit UCn. The other end of the scanning signal line GLn is connected to a waveform adjusting circuit HKn which adjusts the waveform of the pulse signal transmitted through the scanning signal line GLn. Thus, the shift register 11*a* includes the n-th stage circuit UCn and the waveform adjusting circuit HKn which are disposed with the scanning signal line GLn interposed in between.

The waveform adjusting circuit HKn is formed on the same substrate as that of the shift registers 11*a* and 11*b*. The n-th stage circuit UCn and the waveform adjusting circuit HKn are disposed with the display area AA interposed in between. The n-th stage circuit UCn includes a clock terminal CKn through which the clock signal CKA is input, and an output terminal Qn, from which the pulse signal at the n-th stage is output. The output terminal Qn is connected to one end of the scanning signal line GLn.

The shift register 11*b* includes the (n−1)th stage circuit UCn−1. One end of a scanning signal line GLn−1 (the m-th scanning signal line) is connected to the (n−1)th stage circuit UCn−1. The other end of the scanning signal line GLn−1 is connected to a waveform adjusting circuit HKn−1 which adjusts the waveform of the pulse signal transmitted through the scanning signal line GLn−1.

The waveform adjusting circuit HKn−1 is formed on the same substrate as that of the shift registers 11*a* and 11*b*. The (n−1)th stage circuit UCn−1 and the waveform adjusting circuit HKn−1 are disposed with the display area AA interposed in between. The (n−1)th stage circuit UCn−1 includes a clock terminal CKn−1, to which the clock signal CKC is input, and an output terminal Qn−1, from which the pulse signal at the (n−1)th stage is output. The output terminal Qn−1 is connected to one end of the scanning signal line GLn−1.

A driver circuit DR is formed as follows. The (n−1)th stage circuit UCn−1 and the n-th stage circuit UCn are disposed on the opposite sides of the display area AA. The waveform adjusting circuit HKn−1 and the waveform adjusting circuit HKn are disposed on the opposite sides of the display area AA. The driver circuit DR includes the (n−1)th stage circuit UCn−1, the n-th stage circuit UCn, the waveform adjusting circuit HKn−1, and the waveform adjusting circuit HKn. The display area AA (including the pixel electrodes, the transistors connected to the pixel electrodes, the data signal lines, and the scanning signal lines) and the driver circuit DR, which are included in the display device 100, are formed on the same substrate (monolithic formation).

In the display device 100, the waveform adjusting circuit HKn−1 has a smaller size than the (n−1)th stage circuit UCn−1, and the waveform adjusting circuit HKn has a smaller size than the n-th stage circuit UCn. Thus, the display device 100 may have a reduced picture-frame area compared with the reference example (typical two-side input system), as in FIG. 1(*b*), in which pulse signals are input from a pair of circuits, which are disposed on both sides, to its scanning signal line.

The n-th stage circuit UCn includes transistors M1, M5, M6, M7, M8, M9, M10, and M14 and a capacitance C1. All of the transistors are n channel TFTs. The gate terminal of the transistor M1 is connected to an output terminal Qn−2 (a supply terminal of a set signal) of the (n−2) stage circuit; the drain terminal is connected a VDD power supply line (high-potential-side power supply line); the source terminal is connected to a node netAn and the drain terminal of the transistor M9. The diode-connected gate terminal and drain terminal of the transistor M5 are connected to the VDD power supply line; the source terminal is connected to a node netBn. The gate terminal of the transistor M6 is connected to the node netAn; the drain terminal is connected to the node netBn; the source terminal is connected to a VSS power supply line (low-potential-side power supply line). The gate terminal of the transistor M7 is connected to the output terminal Qn−2; the drain terminal is connected to a VSS power supply line; the source terminal is connected to the source terminal of the transistor M5 and the node netBn. The gate terminal of the transistor M8 is connected to the node netBn; the drain terminal is connected to the node netAn; the source terminal is connected to a VSS power supply line. The gate terminal of the transistor M9 is connected to an output terminal Qn+4 (a supply terminal of a reset signal) of the (n+4)th stage circuit; the drain terminal is connected to the node netAn; the source terminal is connected a VSS power supply line. The gate terminal of the transistor M10 is connected to the node netAn; the drain terminal is connected to the clock terminal CKn (to which the clock signal CKA is input); the source terminal is connected to the output terminal Qn. The gate terminal of the transistor M14 is connected to the node netBn; the drain terminal is connected to the output terminal Qn; the source terminal is connected to a VSS power supply line.

In an n channel transistor, one, which has a higher potential, of the drain and the source is called a drain. However, in the description of the specification, one is defined as a drain, and the other is defined as a source. Thus, the source potential may be higher than the drain potential. The gate terminal corresponds to a control terminal. The drain terminal corresponds to a first conductive terminal. The source terminal corresponds to a second conductive terminal.

The waveform adjusting circuit HKn includes a transistor M13 (first transistor), a transistor M16 (second transistor), a transistor M17 (third transistor), and a node netFn connected to the gate terminal of the transistor M13. All of the transistors are n channel TFTs.

The gate terminal of the transistor M13 is connected to the node netFn; the drain terminal is connected to the other end of the scanning signal line GLn; the source terminal is connected to a clock line CKL for the clock signal CKA. The node netFn is connected to the output terminal Qn−1 of the (n−1)th stage circuit, which is the previous stage, through the transistor M16. The transistor M16 is supplied with the pulse signal through the scanning signal line GLn−1 (the m-th scanning signal line) which is scanned prior to the scanning signal line GLn. The drain terminal, which is one of the conductive terminals, of the transistor M16 is connected to the node netFn; the source terminal, which is the other conductive terminal, and the gate terminal are connected to the output terminal Qn−1.

The gate terminal of the transistor M17 is connected to an output terminal Qn+5 (a supply terminal of a reset signal) of the (n+5)th stage circuit; the drain terminal is connected to a VSS power supply line; the source terminal is connected to the node netFn. That is, the node netFn is connected to a potentiostatic source (low power supply) through the transistor M17. The gate terminal of the transistor M17 receives the pulse signal through a scanning signal line GLn+5 that is scanned subsequent to the scanning signal line GLn.

The waveform adjusting circuit HKn adjusts the waveform of the pulse signal, which is transmitted through the scanning signal line GLn, by using the clock signal CKA and the pulse signal from the scanning signal line GLn−1. The transistor M10 of the n-th stage circuit UCn and the transistor M13 of the waveform adjusting circuit HKn are supplied with the clock signal CKA having the same phase.

Figure 3:
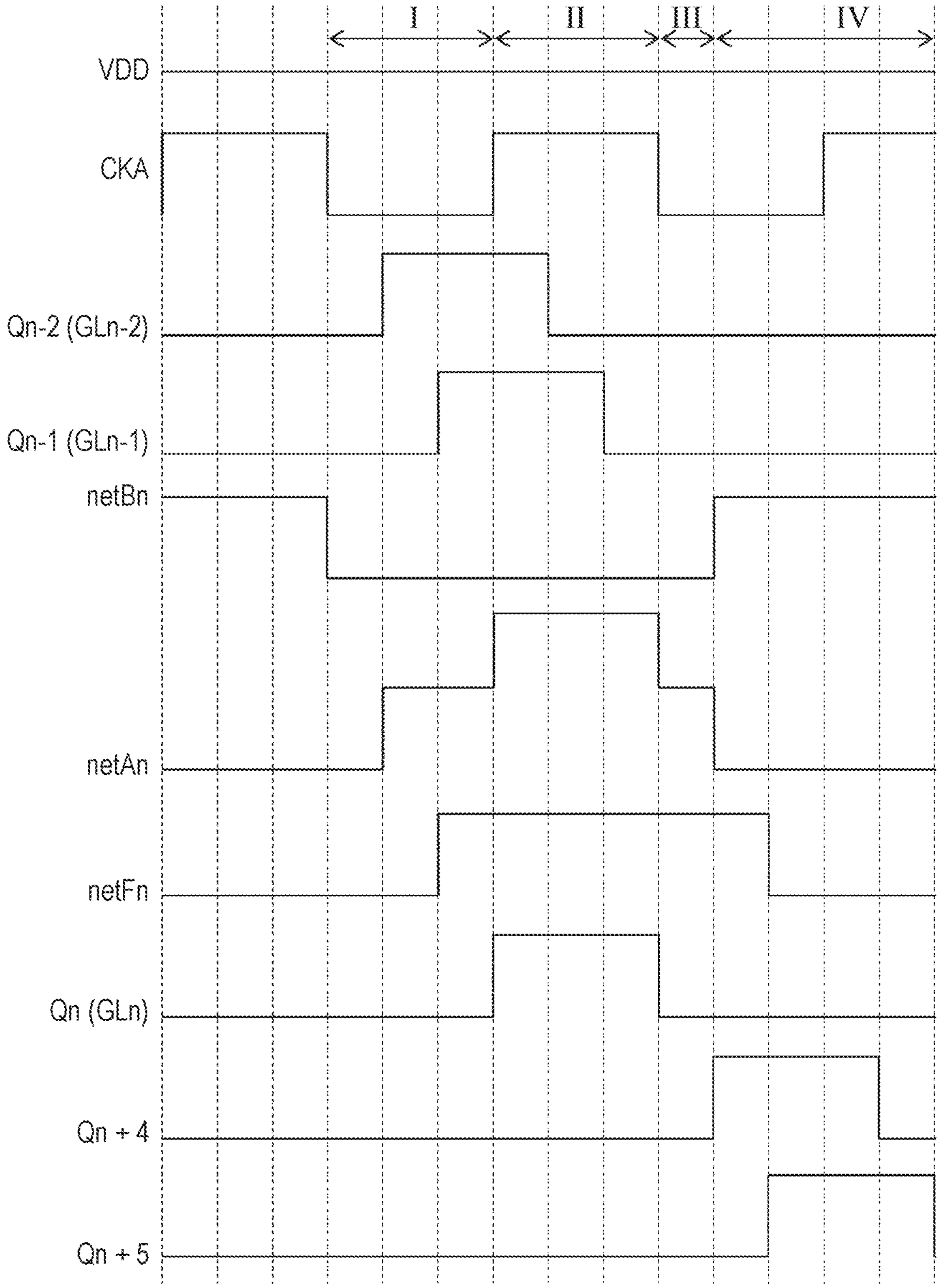
FIG. 3 is a timing chart of node potentials and pulse signals according to the first embodiment.

FIG. 3 is a timing chart of node potentials and pulse signals according to the first embodiment. As illustrated in FIG. 3, when the pulse signal (set signal) at the output terminal Qn−2 of the (n−2) stage circuit rises, the node netAn is set to high. Due to the transistor M7, the node netBn, which is provided to stabilize the node netAn, is set to low. When the pulse signal (set signal) at the output terminal Qn−1 of the (n−1)th stage circuit rises, the node netFn of the waveform adjusting circuit HKn is set to high. The description above corresponds to the period I in FIG. 3.

Subsequently, the clock signal CKA, which is input to the n-th stage circuit UCn and the waveform adjusting circuit HKn, is set to high. At the timing at which the clock signal CKA is set to high, both of the transistors M10 and M13 transmit the high state of the clock signal CKA. The pulse signal at the output terminal Qn (scanning signal line GLn) of the n-th stage circuit is set to high. This causes the node netAn to be boosted due to coupling of the capacitance C1. The period of these waveforms corresponds to the period II in FIG. 3.

Then, the clock signal CKA is set to low. This causes the node netAn to be set to high due to coupling of C1. The pulse signal at the output terminal Qn (scanning signal line GLn) of the n-th stage circuit is set to Low due to a discharge action of the transistors M10 and M13. The description above corresponds to the period III in FIG. 3.

Then, the node netAn is set to low due to a rise of the pulse signal (reset signal) at the output terminal Qn+4 of the (n+4)th stage circuit. The node netFn is set to low due to a rise of the pulse signal (reset signal) at the output terminal Qn+5 of the (n+5)th stage circuit. The description above corresponds to the period IV in FIG. 3.

In the first embodiment, in the period III, the other end side of the scanning signal line GLn is supplied with the clock signal CKA (Low potential) through the transistor M13, and a discharge is smoothly performed through the transistor M13 also on the other end side. Accordingly, the return (so-called falling edge) of the pulse signal is steep on the other end side (trailing end) of the scanning signal line GLn.

Also in the period II, the clock signal CKA (High potential) is supplied from the other end side of the scanning signal line GLn through the transistor M13. Thus, the rise of the pulse signal from the scanning signal line GLn is steep on the other end side of the scanning signal line GLn.

As described above, even when the pulse signal from a subsequent stage is not received, the pulse signal which is output from the output terminal Qn of the n-th stage circuit, the pulse signal transmitted to one end of the scanning signal line GLn, and the pulse signal transmitted to the other end of the scanning signal line GLn may have substantially the same waveform (see FIG. 3).

Second Embodiment

Figure 4:
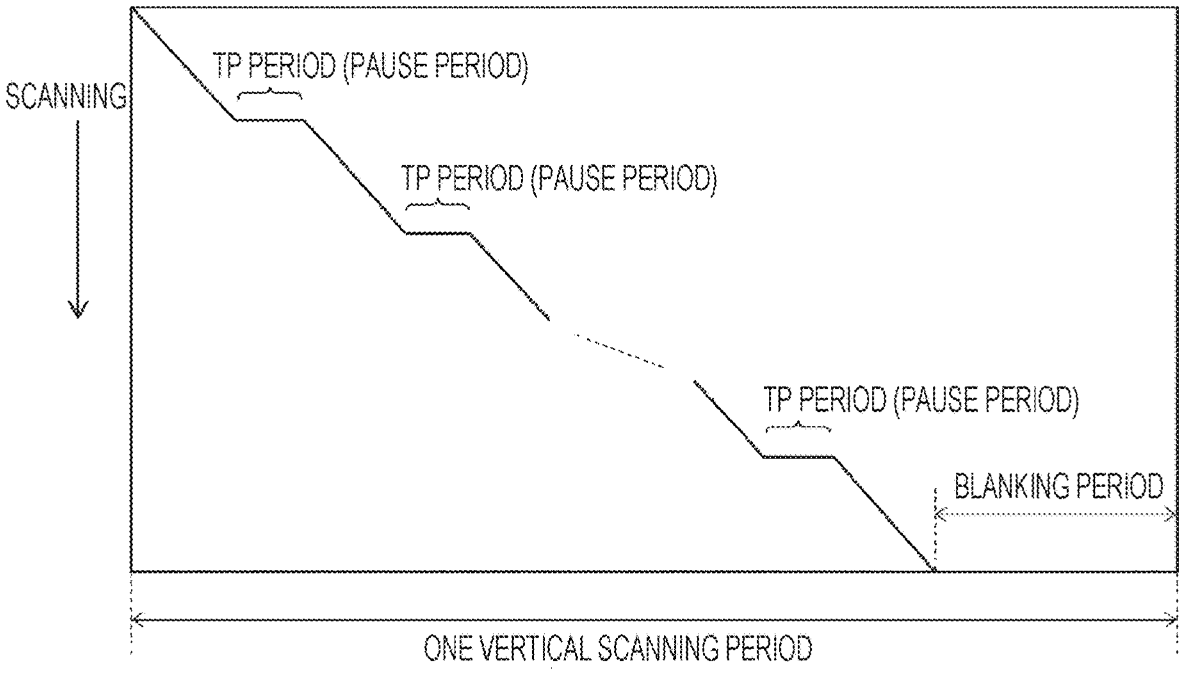
FIG. 4 is a timing chart for pause driving.

As described above, in the display device 100, the pulse signal which has risen at the target stage (the n-th stage) returns (falls) steeply without receiving the pulse signal at a subsequent stage. Thus, the display device 100 is suitable for the case in which pause driving as in FIG. 4 is performed. Pause driving indicates that, while multiple TP periods (pause periods) are provided in one vertical scanning period, the scanning signal lines GL are scanned sequentially. In a TP period, for example, touch sensing may be performed. With respect to this point, if a method of using the pulse signal at a subsequent stage to steeply return (fall) the pulse signal at the target stage is used, there arises a problem that the pulse signal at a pause stage which fails to receive the pulse signal at a subsequent stage is not returned steeply, causing display unevenness.

Figure 5:
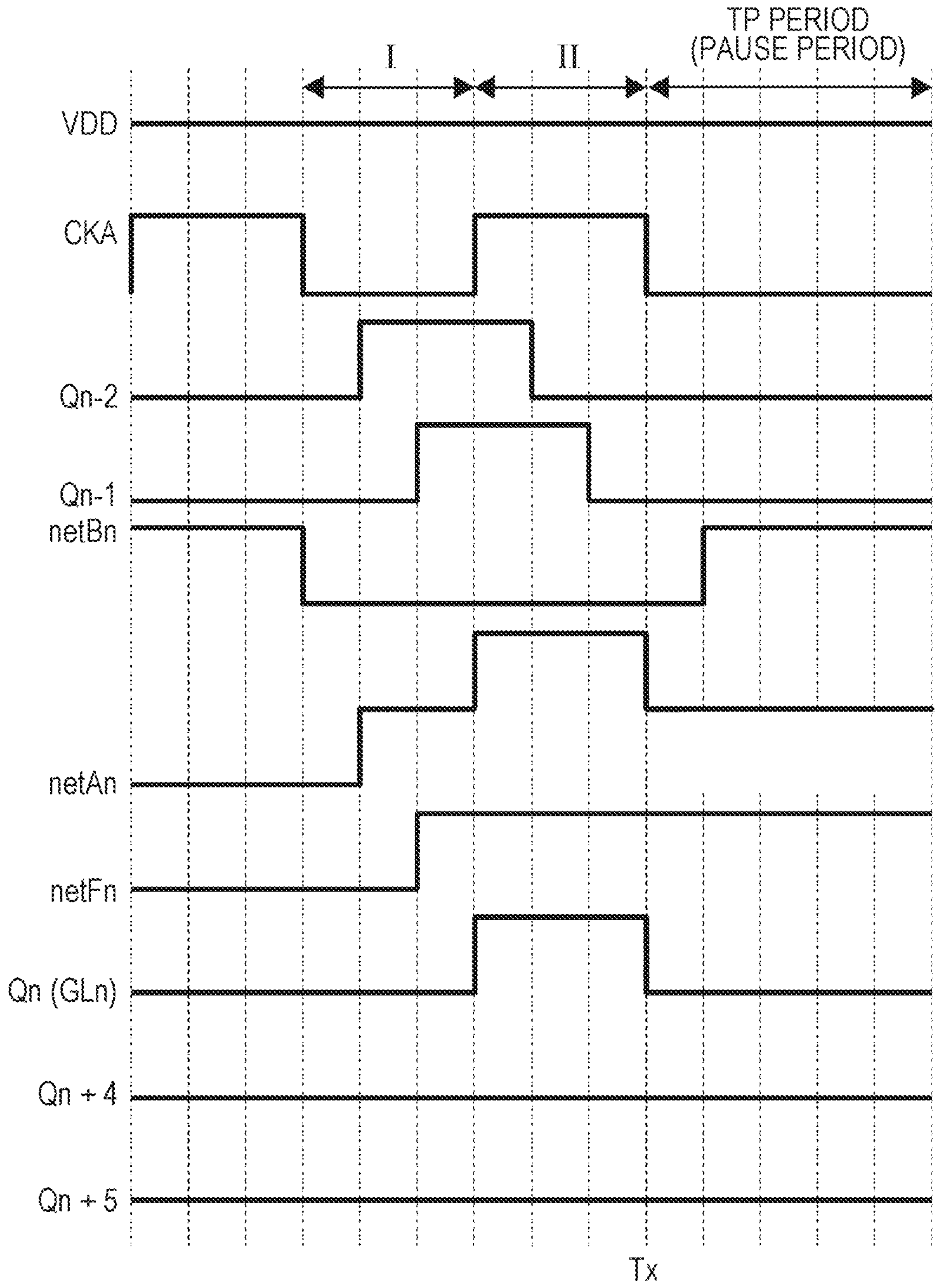
FIG. 5 is a timing chart of node potentials and pulse signals according to a second embodiment (pause driving).

FIG. 5 illustrates node potentials and pulse signals obtained when the scanning signal line GLn has a pause. In FIG. 5, a period after Tx, at which the pulse signal at the output terminal Qn (scanning signal line GLn) of the n-th stage circuit rises, is a pause period. In a pause period, since the pulse signal at a subsequent stage does not rise, the node netAn and the node netFn remain in the High state (that is, the clock signal CKA continues to be output to the scanning signal line GLn). Accordingly, the clock signal CKA is fixed at low. After elapse of a pause period, the shift is restarted due to a return (rise) of the clock signal CKA.

According to the second embodiment, a display panel performing pause driving may achieve a reduction of the picture-frame area and steepening of a return of the pulse signal at a pause stage (which causes suppression of display unevenness).

Third Embodiment

Figure 6:
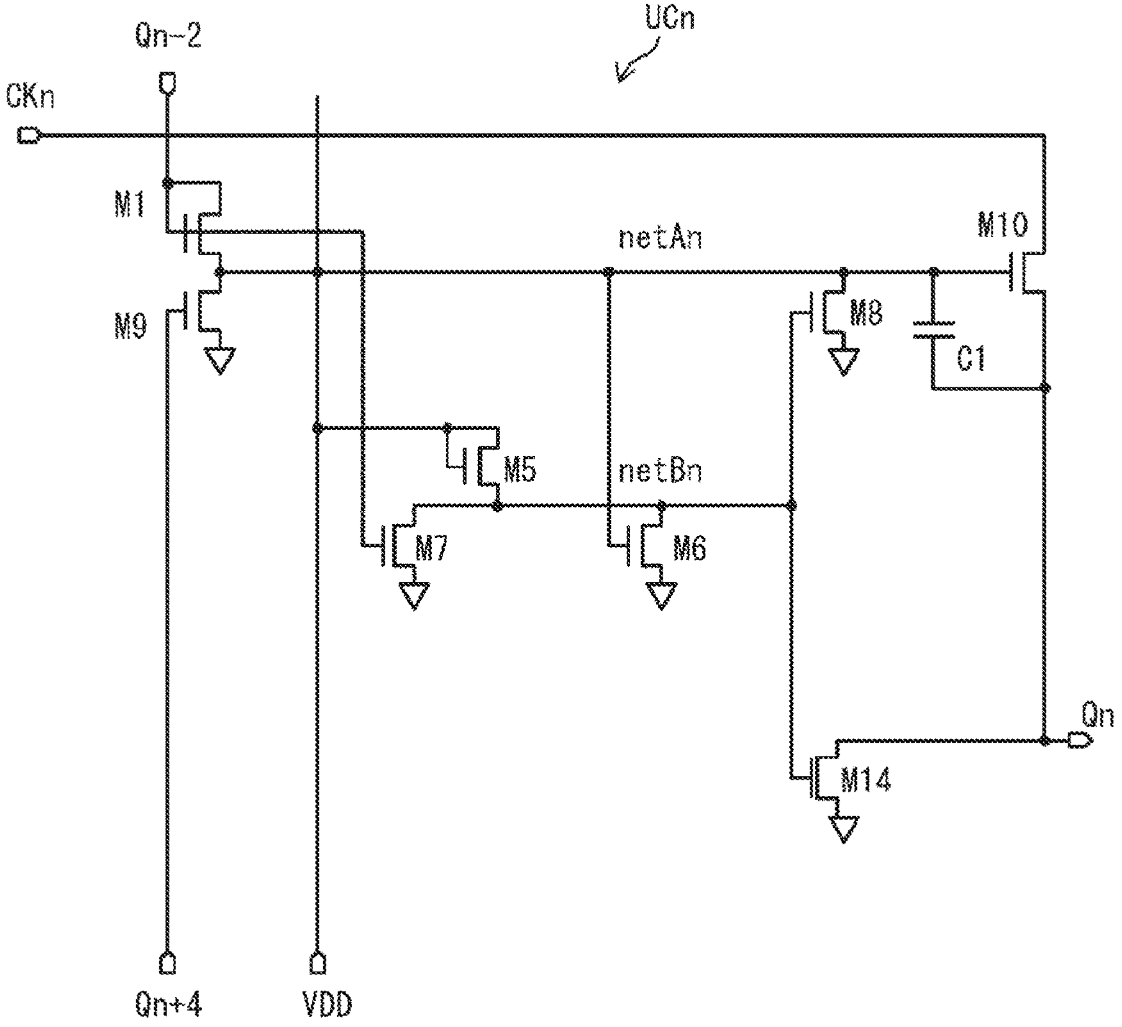
FIG. 6 is a circuit diagram illustrating a configuration of a display device according to a third embodiment.

In the n-th stage circuit UCn according to the first embodiment, the drain terminal of the transistor M1 is connected to the VDD power supply line. However, this is not limiting. As in FIG. 6, the transistor M1 may be diode-connected. Its gate terminal and drain terminal may be connected to the output terminal Qn−2 (a supply terminal of a set signal) of the (n−2)th stage circuit. This produces a merit of simplifying the configuration of the inside of the n-th stage circuit.

The present invention is not limited to the embodiments described above. Various changes may be made in a scope indicated by the claims. An embodiment, which is obtained by appropriately combining technical means disclosed in different embodiments, is also included in the technical scope of the present invention. By combining technical means disclosed in the embodiments, new technical features may be formed.

REFERENCE SIGNS LIST

11*a*, 11*b* shift register
UCn n-th stage circuit
HKn waveform adjusting circuit
100 display device
M13 transistor (first transistor)
M16 transistor (second transistor)
M17 transistor (third transistor)
netFn node
DR driver circuit

The invention claimed is:

1. A display device in which a plurality of scanning signal lines and a driver circuit are formed on a single substrate, the driver circuit supplying a pulse signal to each of the plurality of scanning signal lines, wherein the driver circuit includes an n-th stage circuit and a waveform adjusting circuit, wherein the n-th stage circuit and the waveform adjusting circuit are provided on the single substrate, and an n-th scanning signal line included in the plurality of scanning signal lines is located between the n-th stage circuit and the waveform adjusting circuit, wherein the n-th stage circuit and the waveform adjusting circuit are supplied with a clock signal having an identical phase, wherein the n-th stage circuit outputs a pulse signal to a first end of the n-th scanning signal line, wherein the waveform adjusting circuit is connected to a second end of the n-th scanning signal line, and wherein the waveform adjusting circuit steepens a trailing end of a pulse which is transmitted through the n-th scanning signal line, by using the clock signal and a pulse signal of an m-th scanning signal line scanned prior to the n-th scanning signal line.

2. The display device according to claim 1, wherein the waveform adjusting circuit includes a first transistor, a second transistor, and a node connected to a gate terminal of the first transistor, wherein the second end of the n-th scanning signal line is connected to a signal source of the clock signal through the first transistor, and wherein the node is connected to the m-th scanning signal line through the second transistor.

3. The display device according to claim 2, wherein a first one of conductive terminals of the second transistor is connected to the node, and a second one of the conductive terminals and a gate terminal of the second transistor is connected to the m-th scanning signal line.

4. The display device according to claim 1, wherein the waveform adjusting circuit includes a first transistor, a second transistor, a third transistor, and a node connected to a gate terminal of the first transistor, and wherein the node is connected to a power supply through the third transistor.

5. The display device according to claim 4, wherein a gate terminal of the third transistor receives a pulse signal of a scanning signal line scanned subsequent to the n-th scanning signal line.

6. The display device according to claim 1, comprising: a semiconductor layer that includes an oxide semiconductor.

7. A method of driving a display device according to claim 1, wherein one or more scan pause periods are provided in one vertical scanning period, and the clock signal is fixed in an inactive state during the one or more scan pause periods.

8. A display device in which a plurality of scanning signal lines and a driver circuit are formed on a single substrate, the driver circuit supplying a pulse signal to each of the plurality of scanning signal lines, wherein the driver circuit includes an n-th stage circuit and a waveform adjusting circuit, wherein the n-th stage circuit and the waveform adjusting circuit are provided on the single substrate, and an n-th scanning signal line included in the plurality of scanning signal lines is located between the n-th stage circuit and the waveform adjusting circuit, wherein the n-th stage circuit and the waveform adjusting circuit are supplied with a clock signal having an identical phase, wherein the n-th stage circuit outputs a pulse signal to a first end of the n-th scanning signal line, wherein the waveform adjusting circuit is connected to a second end of the n-th scanning signal line, and wherein the display device has one or more scan pause periods in one vertical scanning period, and in the one or more scan pause periods, the waveform adjusting circuit outputs, to the n-th scanning signal line, the clock signal which is deactivated.

9. The display device according to claim 8, wherein the waveform adjusting circuit includes a first transistor, a second transistor, and a node connected to a gate terminal of the first transistor, wherein the second end of the n-th scanning signal line is connected to a signal source of the clock signal through the first transistor, and wherein the node is connected to a m-th scanning signal line through the second transistor.

10. The display device according to claim 9, wherein a first one of conductive terminals of the second transistor is connected to the node, and a second one of the conductive terminals and a gate terminal of the second transistor is connected to the m-th scanning signal line.

11. The display device according to claim 8, wherein the waveform adjusting circuit includes a first transistor, a second transistor, a third transistor, and a node connected to a gate terminal of the first transistor, and wherein the node is connected to a power supply through the third transistor.

12. The display device according to claim 11, wherein a gate terminal of the third transistor receives a pulse signal of a scanning signal line scanned subsequent to the n-th scanning signal line.

13. The display device according to claim 8, comprising: a semiconductor layer that includes an oxide semiconductor.

14. A method of driving a display device according to claim 8, wherein one or more scan pause periods are provided in one vertical scanning period, and the clock signal is fixed in an inactive state during the one or more scan pause periods.

* * * * *